(12) United States Patent
Sandler

(10) Patent No.: US 11,918,904 B2
(45) Date of Patent: Mar. 5, 2024

(54) SYSTEMS AND METHODS FOR WAGERING

(71) Applicant: Jonathan Sandler, Las Vegas, NV (US)

(72) Inventor: Jonathan Sandler, Las Vegas, NV (US)

(73) Assignee: Jonathan Sandler, Las Vegas, NV (US)

( * ) Notice: Subject to any disclaimer, the term of this patent is extended or adjusted under 35 U.S.C. 154(b) by 0 days.

(21) Appl. No.: 17/675,555

(22) Filed: Feb. 18, 2022

(65) Prior Publication Data

US 2023/0191251 A1    Jun. 22, 2023

Related U.S. Application Data

(60) Provisional application No. 63/291,719, filed on Dec. 20, 2021.

(51) Int. Cl.
| | | |
|---|---|---|
| *A63F 13/537* | (2014.01) | |
| *A63F 13/792* | (2014.01) | |
| *A63F 13/812* | (2014.01) | |

(52) U.S. Cl.
CPC .......... *A63F 13/537* (2014.09); *A63F 13/792* (2014.09); *A63F 13/812* (2014.09)

(58) Field of Classification Search
None
See application file for complete search history.

(56) References Cited

U.S. PATENT DOCUMENTS

| | | | |
|---|---|---|---|
| 5,683,090 A | 11/1997 | Zeile et al. | |
| D749,604 S | 2/2016 | Trousdell et al. | |
| 9,514,604 B1* | 12/2016 | Cioe | A63F 13/573 |
| 10,409,363 B1* | 9/2019 | Kudirka | A63B 71/0622 |
| 10,438,449 B2 | 10/2019 | Triplett | |
| 2005/0187029 A1* | 8/2005 | Kimmel | A63B 67/02 |
| | | | 473/409 |
| 2006/0094490 A1* | 5/2006 | Reeves | G07F 17/32 |
| | | | 463/16 |
| 2007/0249426 A1* | 10/2007 | Gialo | A63B 71/06 |
| | | | 473/7 |
| 2013/0085018 A1 | 4/2013 | Jensen et al. | |
| 2014/0068659 A1 | 3/2014 | Vasilikakis et al. | |

(Continued)

OTHER PUBLICATIONS

Foresight Sports. "Foresight Sports Presents . . . Golf Roulette!" https://www.youtube.com/watch?v=3IGazUJjbFU. Jul. 18, 2018 (Year: 2018).*

(Continued)

*Primary Examiner* — Reginald A Renwick
(74) *Attorney, Agent, or Firm* — Dickinson Wright PLLC

(57) ABSTRACT

A system for wagering including a server computing device including a processor; and a memory including instructions that, when executed by the processor, cause the processor to cause a virtual representation of a region of a golf course to be displayed on a user device; determine one or more virtual shapes; determine a value associated respectively with each of the one or more virtual shapes; cause the user device to display the one or more virtual shapes over the virtual representation; cause the user device to display the one or more values associated respectively with the one or virtual shapes; and receive a bet selection from the user device.

17 Claims, 9 Drawing Sheets

(56) References Cited

U.S. PATENT DOCUMENTS

| | | | |
|---|---|---|---|
| 2016/0358406 A1* | 12/2016 | Daly | H04N 21/4312 |
| 2017/0124812 A1* | 5/2017 | Washington | G07F 17/3269 |
| 2019/0344160 A1 | 11/2019 | Kim et al. | |
| 2020/0020202 A1 | 1/2020 | Kim et al. | |
| 2020/0380812 A1 | 12/2020 | Nelson et al. | |
| 2021/0104129 A1* | 4/2021 | Srinivasan | G07F 17/3211 |
| 2021/0213338 A1 | 7/2021 | Hoyt et al. | |
| 2021/0264740 A1 | 8/2021 | Flores et al. | |
| 2022/0292783 A1* | 9/2022 | Jayaram | H04N 23/90 |

OTHER PUBLICATIONS

Dart Golf, retrieved from https://washingtongolfandtravelshow.com/show-features/dart/ oon Feb. 14, 2022, 2 pages.

IMG Arena, Golf Event Center, retrieved from https://www.imgarena.com/sports-betting/event-centres/golf-event-centre/ on Feb. 14, 2022, 7 pages.

* cited by examiner

SYSTEMS AND METHODS FOR WAGERING

CROSS-REFERENCE TO RELATED APPLICATIONS

The present application claims priority to U.S. Provisional Patent Application Ser. No. 63/291,719 filed Dec. 20, 2021 and entitled "Systems and Methods for Wagering" the entirety of which is incorporated by reference herein.

BACKGROUND OF THE INVENTION

1. Field of the Invention

The present disclosure relates generally to a sports wagering system. More specifically, the present disclosure relates to a wagering system for a game of golf.

2. Description of Related Art

Golfing is a favorite pastime of both young and old. The first rudimentary version of golf was played in $15^{th}$-century Scotland and has progressively become more and more popular internationally. This ever increasing popularity has resulted in numerous commercial opportunities, which in turn have resulted in considerable development of the sport.

An aspect of golf that has always been a part of golf is making wagers for games or sub-wagers, including for individual holes between competitors. The wagers may include anything from scoring par to scoring better than another player or team on a hole or for a round. Recent developments in technology have created opportunities for spectators to place wagers on various aspects of golf.

Accordingly, there is a continuing desire to further develop golf wagering systems that provide novel and exciting ways of wagering on a game of golf.

SUMMARY OF THE DISCLOSURE

This disclosure relates generally to systems and methods for a sports wagering system, such as an on-line system via a mobile application that allows real-time wagering on golf events.

The foregoing has outlined rather broadly the features and technical advantages of the present disclosure in order that the detailed description of the disclosure that follows may be better understood. Additional features and aspects of the disclosure will be described hereinafter that form the subject of the claims of the disclosure. It should be appreciated by those skilled in the art that the conception and the specific aspects disclosed may be readily utilized as a basis for modifying or designing other aspects for carrying out the same purposes of the present disclosure. It should also be realized by those skilled in the art that such equivalent embodiments do not depart from the spirit and scope of the disclosure as set forth in the appended claims. This section provides a general summary of the disclosure and is not to be interpreted as a complete and comprehensive listing of all of the objects, aspects, features and advantages associated with the present disclosure.

It is therefore an aspect of the disclosure to provide a system for wagering. The system includes a server computing device including a processor and a memory including instructions that, when executed by the processor, cause the processor to cause a virtual representation of a region of a golf course to be displayed on a user device. The instructions further cause the processor to determine one or more virtual shapes. The instructions further cause the processor to determine a value associated respectively with each of the one or more virtual shapes. The instructions further cause the processor to cause the user device to display the one or more virtual shapes over the virtual representation. The instructions further cause the processor to cause the user device to display the one or more values associated respectively with the one or virtual shapes. The instructions further cause the processor to receive a bet selection from the user device.

It is another aspect of the disclosure to provide a method of wagering. The method includes causing a virtual representation of a region of a golf course to be displayed on a user device. The method further includes determining one or more virtual shapes. The method further includes determining a value associated respectively with each of the one or more virtual shapes. The method further includes causing the user device to display the one or more values associated respectively with the one or virtual shapes. The method further includes receiving a bet selection from a user device.

It is another aspect of the disclosure to provide a non-transitory computer-readable storage medium including instructions that, when executed by one or more processors, cause the one or more processors to cause a virtual representation of a region of a golf course to be displayed on a user device. The instructions further cause the one or more processors to determine one or more virtual shapes. The instructions further cause the one or more processors to determine a value associated respectively with each of the one or more virtual shapes. The instructions further cause the one or more processors to cause the user device to display the one or more virtual shapes over the virtual representation. The instructions further cause the one or more processors to cause the user device to display the one or more values associated respectively with the one or virtual shapes. The instructions further cause the one or more processors to receive a bet selection from the user device.

These and other aspects of the present disclosure are provided in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION OF THE DISCLOSURE

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

Referring to the Figures, wherein like numerals indicate corresponding parts throughout the several views, a golf wagering system is illustrated. The golf wagering system may be configured as a semi-virtual golf system that involves generating various shapes on a real golf course. The golf system provides novel and exciting ways of wagering on a game of golf.

Figure 1:
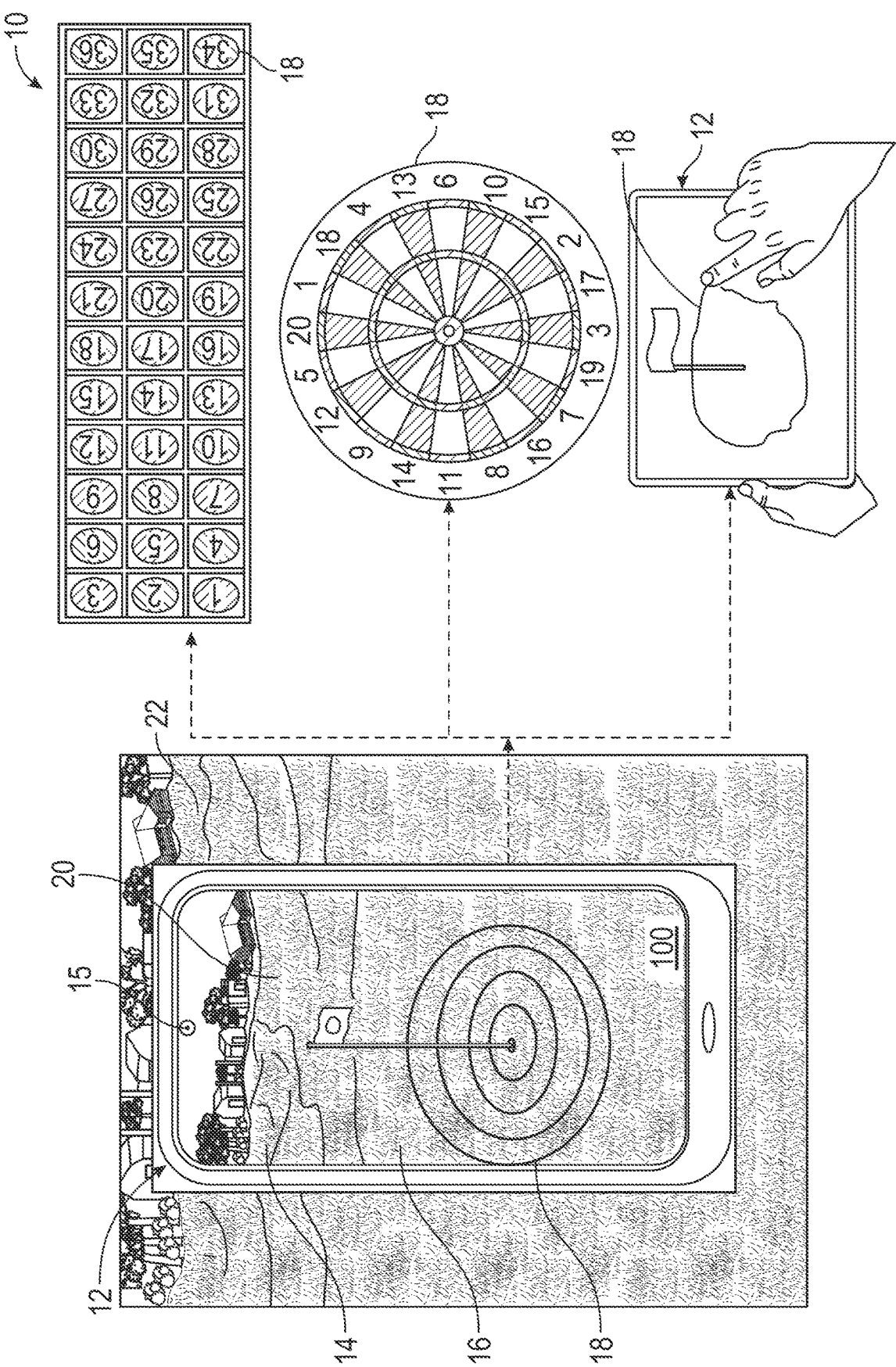
FIG. 1 illustrates a perspective view of a golf wagering system including a plurality of virtual shapes generated on a real golf course.

Referring initially to FIG. 1, the present disclosure relates to a golf wagering system 10. The golf wagering system 10 includes a computing device 12, such as laptop, tablet, smart phone, the like, or combinations thereof. According to a preferred aspect, the golf wagering system 10 accessed through a mobile application that exists on the computing device and can be accessed by a user in order to make wagers on a sports event. According to an aspect the system resides elsewhere, such as on a cloud server, as is readily understood by one of ordinary skill in the art. According to an aspect, the sports game is a game of golf and the wagers include various wagers on the game of golf as described in more detail herein.

Figure 2:
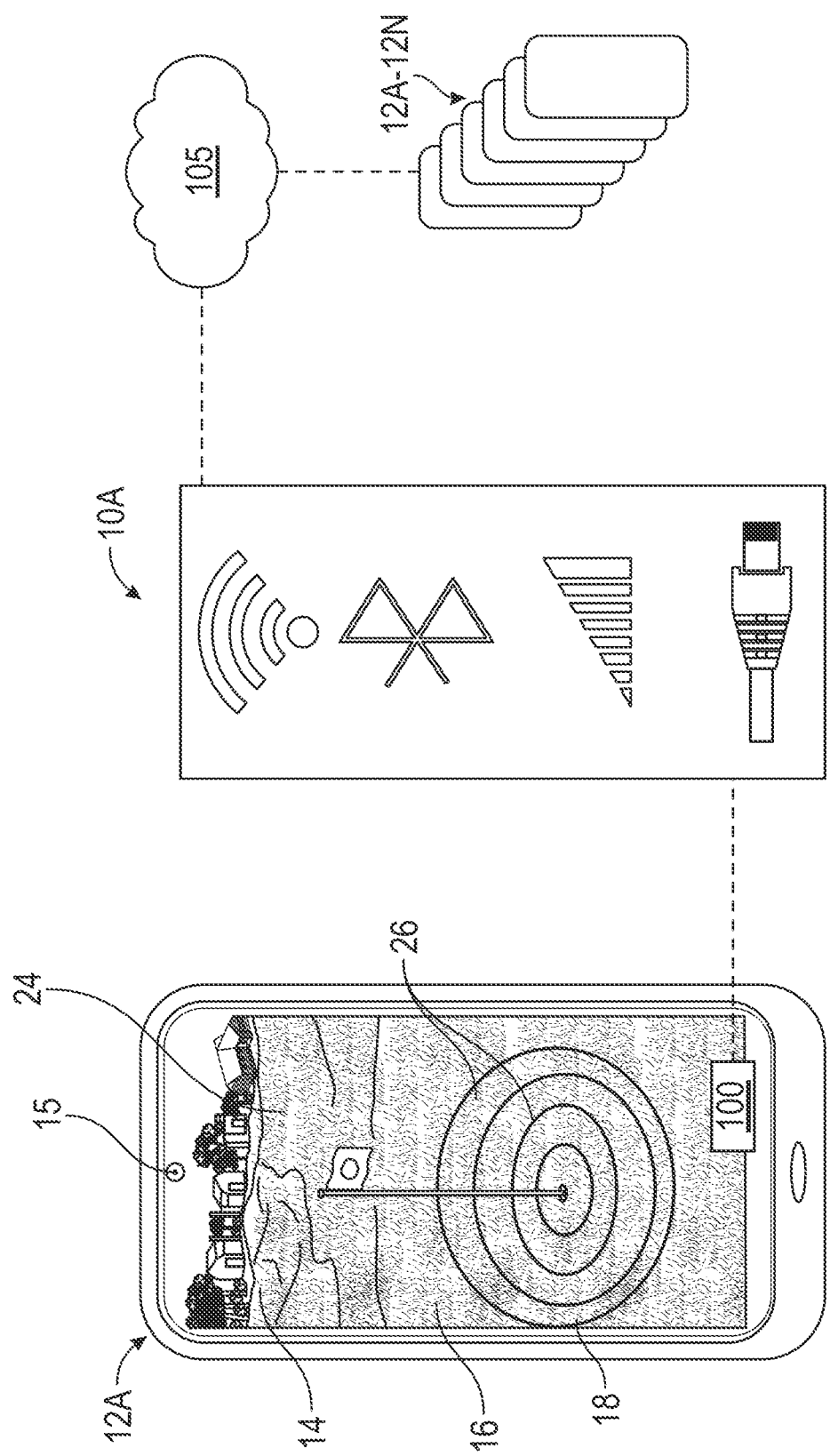
FIG. 2 illustrates a perspective view of the golf wagering system in accordance with another aspect.

According to another aspect, the computing device 12 includes a screen 14, an image capturing device 15, a user interface 16 (e.g., mouse, keyboard, touchscreen, and/or the like), and a control system 100 (FIG. 2).

As part of the wagering system, a player may select, on the user interface 16, one of a plurality of virtual shapes 18 that are overlaid on real world image 20 of a golf course 22. The real world image 20 may be generated with the image capturing device 15 and/or otherwise obtained (e.g., over a network and/or the like). The real world image 20 may include a real time video, a captured photo, an aerial map (photo or drawing), received images, or combinations thereof. The shapes and image can be presented based on the golf course and/or hole that the user will be making wagers on. As an initial step, the player will be presented with a user interface 16 with a golf event on which they can make a wager.

Once a virtual shape 18 is selected, the control system 100 may generate the shape 18 and overlay it on the real world image 20. The control system 100 may be configured to permit the shape 18 to be fixed over a region of the golf course 22 associated with the real world image 20 such as a green on a par 3. As such, a player moves around the golf course 22 the virtual shape 18 remains stationary relative to the golf course (e.g., the hole). In instances wherein the real world image 20 includes a real time video, the virtual shape 18 appears as if it is physically overlaid on the golf course 22, such that its orientation moves in concert with the region of the golf course 22 viewed from the screen 14. In some embodiments, the virtual shape 18 may account for varied topography such that a view other than a direct aerial view appears distorted based on the image overlaying a topography with changing grades. In some embodiments, the control system 100 may be configured to permit the shape 18 to move over a region of the golf course 22 associated with the real world image 20. In some embodiments, the virtual shape 18 may be associated with portions of the golf course 22, e.g. the virtual shape 18 may be associated with a sand pit, green, water, hill, tree, and/or the like.

The virtual shape 18 may include one or more regions 24 each associated with a value. For example, the virtual shape 18 may include grids, concentric circles, and other regions associated with numerical, card suit, colors, other values, or combinations thereof. As such, games and/or wagers may be made on a golf shot or a combination of shots. In some embodiments, the games and/or wagers may include a single shot with a highest value, called suit, called region, or other values. In some embodiments, the games and/or wagers may include a sequence of shots from two teams, for example, tic-tac-toe. In some embodiments, the games and/or wagers may include a sequence of shots from one player or one team, for example, five shots in a poker-style game. According to another aspect, the virtual shape of overlay may be configured as a roulette table, a craps table or a dart board. According to an example where the virtual shape is configured as a roulette layout, the various regions could correspond to the various betting areas in a roulette game. The odds or payout associated with each region would be based on a variety of factors, including as described herein. Such that if a user makes a wager on a region and a player hits the ball into that region, such as on a par 3, the user would be paid out based on the generated odds. It will also be appreciated that the user can select which overlay to utilize based on the options presented to them on their mobile device.

In some embodiments, the virtual shape 18 may provide a vertical target that extends upwardly from a region of the golf course 22. For example, vertical targets, animals, persons, or the like may be generated. These vertical targets may move with respect to the golf course 22. In some embodiments, the virtual shape 18 may include one or more region 24 that a player needs to avoid. For example, the virtual shape 18 may include a virtual target configured as one or more moveable or fixed animals. If a player hits the one or more animals, the player must retake their shot and have their score depleted. In some embodiments, the virtual shape 18 may include a region that permits a player's shot to not count against their final score (e.g., a free shot).

FIG. 2 illustrates a perspective view of the golf wagering system in accordance with another aspect. In some embodiments, the computing device 12 may display, on the screen 14, a digital image 24 from a game a golf (e.g. a professional game of golf such as a golf tournament aired on television). The digital image 24 may include live stream of the game of golf, an image or a course, a green, or a hole, or combinations thereof. The digital image 24 may be received from a network 105 (e.g. a live or non-live stream of the game of golf). The network 105 may further connect or otherwise transmit the digital image 24 to a plurality of computing devices 12A-12N, wherein N equal all natural numbers.

A user may select, with the user interface 16, one or more players, holes, or regions of the golf course. Once selected, a virtual shape 18 may be generated over a region of the golf course generated as the digital image 24. According to one aspect, the virtual image 18 is a shape configured to be over the golf green. A user may then select one or more discrete portions 26 of the virtual shape 18 or an entire virtual shape 18. Each virtual shape 18 or discrete portion 26 of the virtual shape 18 may then be assigned a value. The value may be assigned by the user of the computing device 12 as an offering to one or more users of other computing devices 12A-12N as a wager, including based on a variety of inputs that associate the value with how likely an event is to occur associated with a discrete portion of a region 26. Alternatively, the value may otherwise be generated by the control system 100 as an offering to one or more users (e.g. a wager).

Figure 3:
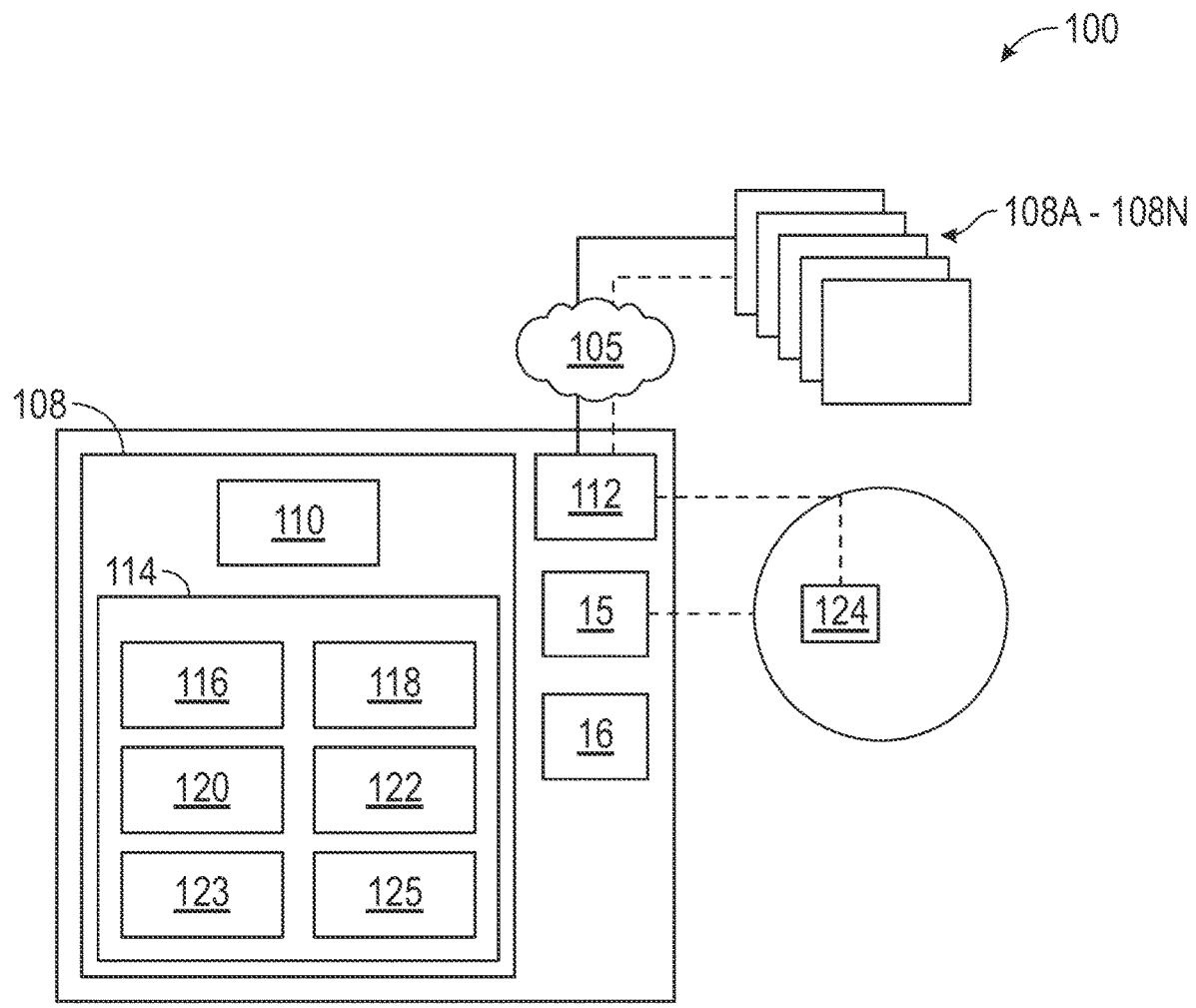
FIG. 3 illustrates a control system of the golf wagering system.

The control system 100 is illustrated in FIG. 3 and may include a controller 108 that includes a processor 110, a communications unit 112 (for example associated with wired or wireless internet, Bluetooth, or other short and long range connections), and a memory 114 having machine-readable non-transitory storage. The memory 114 may include instructions that, when executed by the processor 110, cause the processor 110 to, at least, perform the methods described herein.

Programs and/or software 116 are saved on the memory 114 and so is course profile data 118 (e.g., topography, green shapes, hole locations, etc.) of at least one region of a golf course (e.g., individual holes, a whole golf course, a plurality of golf course) as generated by the image capturing device 15 or otherwise received from the network 105. Game data 120 may include a series of present virtual shapes 18, regions, values, etc. In some embodiments, the game data 120 may further include shapes drawn with the user interface 16 and saved in memory 114. The control system 100 may further include a scoring module 122, for example, saved in memory 114. The scoring module 122 may accumulate scores in a multi-shot game. In some embodiments, the scoring module 122 may include fixed wager amounts, agreed upon amounts input by one or more users, and/or the like. In some embodiments, the scoring module 122 may include fixed wager amounts associated with one or more PGA Tour data, pin location, a player's handicap status, location and slope of green, and/or the like. The fixed wager amounts may change based on a pin location associated with the computing device 12 or any of the other inputs, including the player and various information about their performance.

In some embodiments, a tracking unit 124 may be located in or associated with a golf ball 126 to track a ball flight and/or final destination. In some embodiments, the image capturing device 15 may be configured to recognize a golf ball 126 based on a shape, color, or combination thereof to track a ball flight and/or final destination. The processor 110 carries out instructions based on at least one or more of the software 116, course profile data 118, game data 120, scoring module 122, and player profile data 123.

In some embodiments, the control system 100 may include a wager module 125 and may process wagers between two or more players or users between wagers, games, or other time periods. Alternatively, the wager module may allow an individual to place wagers on various outcomes associated with a game of golf, such as is being displayed on television. The wager module 125 may further generate values for a virtual shape 18 or discrete portion 26 based on one or more of the information contained within memory 114. For example, player profile data 123 may include historical records of a golf player (e.g. a handicap, historical performance such as for example the player's performance on par threes and/or scoring history over recent periods and/or the like) and the course profile data 118 may include historical records of the golf player or a plurality of golf players on the specific course, hole, green, or combinations thereof. The wager module may then extrapolate (e.g. based on the course profile data 118 and player profile data 123) values or odds associated with the virtual shape 18 or the discrete portion 26 of the virtual shape 18, allowing users to select the virtual shape 18 or the discrete portion 26 of the virtual shape 18 at an assigned value. For example, a user may place a wager on a player hitting a golf ball into a selected discrete portion of the grid. Each player may have different values or odds associated with the discrete portions depending upon the value of their inputs. The wager module 125 may further facilitate payment, over the network 105 or otherwise, to one or more users who picked the virtual shape 18 or the discrete portion 26 of the virtual shape 18 that the golf ball lands on, comes to a rest on, etc.

In some embodiments, the virtual shape 18 or the discrete portion 26 of the virtual shape 18 may be selected by user or generated by the processor 110 a negative value. For example, a user may select a virtual shape 18 or the discrete portion 26 of the virtual shape 18 that the ball will not land on, come to a rest on, etc. (e.g. a green, within a distance of the hole, and/or the like).

In some embodiments, the control system 100 may include a plurality of computing devices 12 that communicate via one or more communications units 112 to implement the methodologies disclosed herein. As such, one step may be implemented by a first computing device 12 and another step may be implemented by a second computing device 12 that is in communication with the first computing device 12. In some embodiments, the wager module 125 may generate options on the computing device, such as double or nothing. For example, if a user may place a wager on a second player after the outcome is determined for the user's wager on the first player, this option may be presented.

In some embodiments, the network 105 may connect to a plurality of computing devices 12A-12N (e.g. controllers 108A-108N) and may permit communication there between over the network 105. Therefore, in some embodiments, the wager module 125 may permit users to make an offering of a value to a virtual shape 18 or discrete portion 26 of the virtual shape 18 that may be provided to other computing devices 12A-12N through the network.

Figure 4:
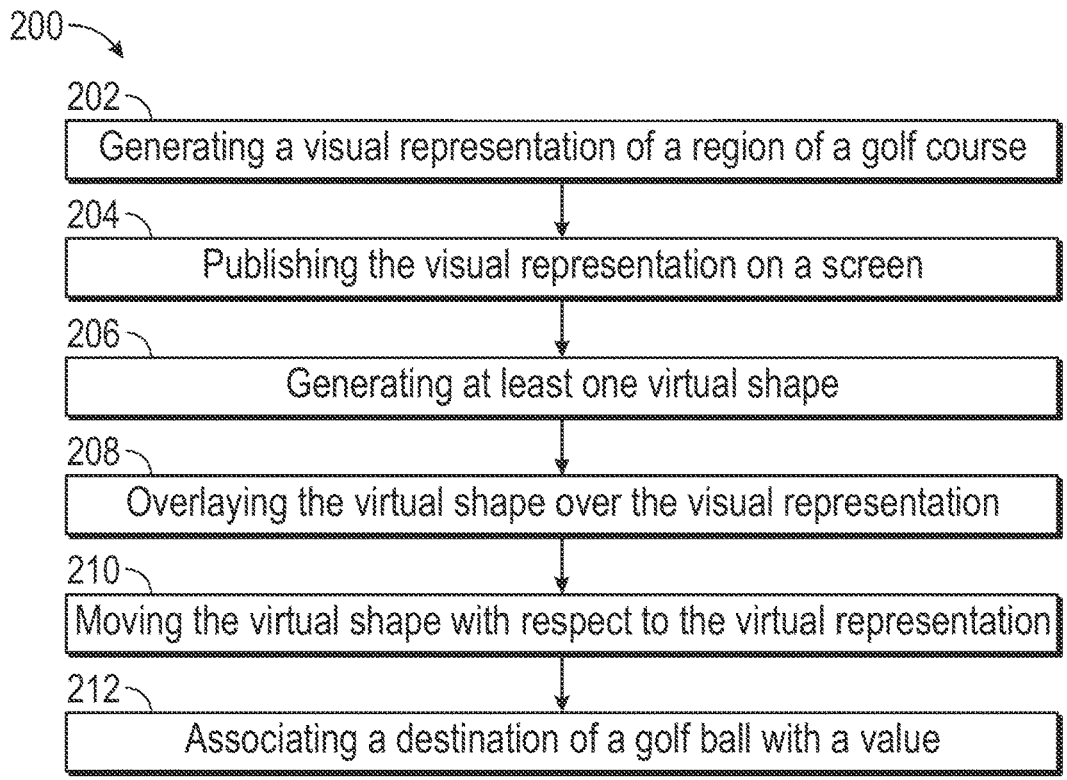
FIG. 4 illustrates a flow chart illustrating a method of wagering on a game of golf in accordance with the present disclosure.

As illustrated in FIG. 4, the subject invention further includes a method 200 of playing a game of golf in accordance with the present disclosure. In some embodiments, at 202, the method 200 may include a step of generating a visual representation of a region of a golf course such as a green on a par 3. For example, the visual representation may include a real time video, a captured photo, an aerial map (photo or drawing), received images, or combinations thereof. The step of generating may include capturing the representation via an image capturing device and/or otherwise obtaining the visual representation (e.g., over a network and/or the like).

In some embodiments, at 204, the method 200 may include a step of publishing the visual representation on a screen. For example, the screen of a computing device.

In some embodiments, at 206, the method 200 may include a step of generating at least one virtual shape, for example, grids, concentric circles, and other regions associated with various areas having different values. In some embodiments, the at least one virtual shape may include a vertical target that extends upwardly from a region of the golf course such as a pin.

In some embodiments, at 208, the method 200 may include overlaying the virtual shape over the visual representation. For example, the processor may overlay the virtual shape over a real time video of the region.

In some embodiments, at 210, the method 200 may include moving the virtual shape with respect to the virtual representation. For example, the processor may cause the virtual shape to move on the virtual representation.

In some embodiments, at 212, the method 200 may include associating a destination of a golf ball with a value. For example, a golf ball or sequence of golf balls may be scored and the score may be accumulated with the scoring module. In some embodiments, the value may be associated with a wager or series of wagers.

Figure 5:
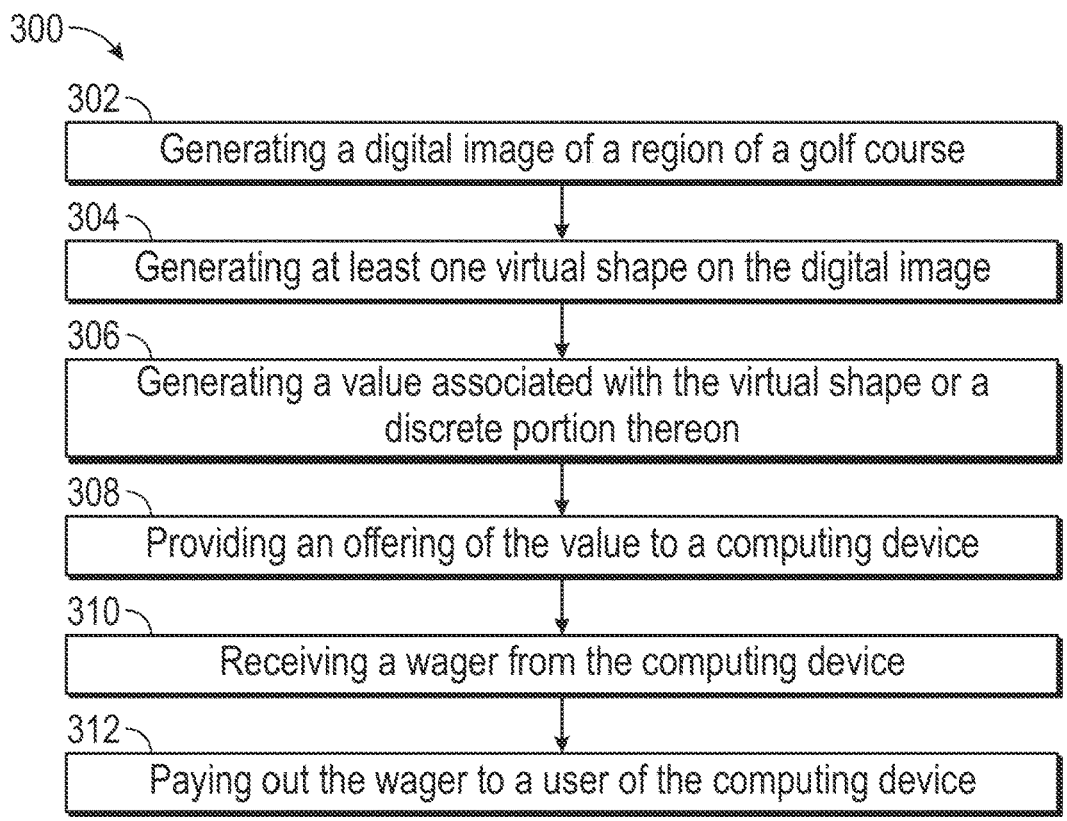
FIG. 5 illustrates a flow chart illustrating a method of participating in a game of golf through a wagering system in accordance with another aspect of the present disclosure.

As illustrated in FIG. 5, the subject invention further includes a method 300 of participating in a game of golf in accordance with the present disclosure. In some embodiments, at 302, the method may include generating a digital image of a golf course (e.g. from the network) such as a green.

In some embodiments, at 304, the method 300 may include generating at least one digital image of a golf course or region of the golf course. For example, the network may transmit and image to one or more computing devices for display on a mobile device.

In some embodiments, at 306, the method 300 may include generating a value associated with the virtual shape or a discrete portion thereon. More preferably, the virtual shape is a grid that is generated by the processor 110 and displayed on a golf green with different regions corresponding to different distances for the hole. The processor 110 also generated and displays values or odds associated with each of the different regions with the odds being generated based on the player selected and other inputs as discussed herein. For example, the wager module may extrapolate a value associated with a player profile data, a course profile data, and/or a combination thereof. In some embodiments, the values are wagering odds for a user to bet on.

In some embodiments, at 308, the method 300 may include providing an offering of the value to a computing device. For example, the wager module may generate the value or values associated with a virtual shape or discrete portion thereof to one or more computing devices. In some embodiments, upon a user selecting a value, the player's selection may be offered to one or more other computing devices. It will be appreciated that the value or odds may vary depending upon the player selected, course conditions, etc.

In some embodiments, at 310, the method 300 may include receiving the offering as a wager from the computing device. For example, the offering generated by the wager module or selected by a user.

In some embodiments, at 312, the method 300 may include paying out the wager to the user who placed the wager if the outcome he placed the wager on is met. For example, the wager module may pay a monetary value associated with the value generated by the computing device or otherwise selected by a user. For example, according to an aspect, a user my open a mobile application on a mobile device and then navigate to an area associated with a golf event that will occur or is occurring. The user may then select a player to follow or hole to navigate too. The user may then place a wager on an outcome of a shot for the player or on a particular hole. For example, the user may select an input that allows a wager to be placed on whether a player will hit it to an area within a certain distance of the target, such as a hole. The user may be presented various options on a particular hole or green each having different odds or value based on the likelihood of it occurring given various inputs. The options can be presented as an overlay on a green that the user can select. It will be appreciated that the user can vary the shapes/distances and the processor will adjust the values accordingly. Once the user has made a selection and the event has occurred the wager is settled. The user may then bet on other players in the group. The user may also bet on the first player's next shot. It will be appreciated that a variety of other wagers our outcomes may occur.

In some embodiments, the methods 200, 300 described herein may further provide additional offerings or options to go double or nothing. For example, the wager module, or based on a selection by a user, may play double or nothing on a next shot from a player (e.g. making a birdie or putt). The offerings may be provided in real-time as the game of golf is played or a series of wagers for a player or for a series of players on a particular hole. A user may be provided the option of betting on players in the next group (if that is how the user has chosen to bet. If they have chosen the "Keno" option, they can choose to which players to apply the chosen location on the grid. The user interface may display options to bet a preset number of shots. For example, a user may be required to have a certain credit line associated with a number of bets/shots. A user may initially select, with the user interface, to only take offerings associated with a particular player or hole. The ball may be displayed on the digital image or real world image.

Figure 6:
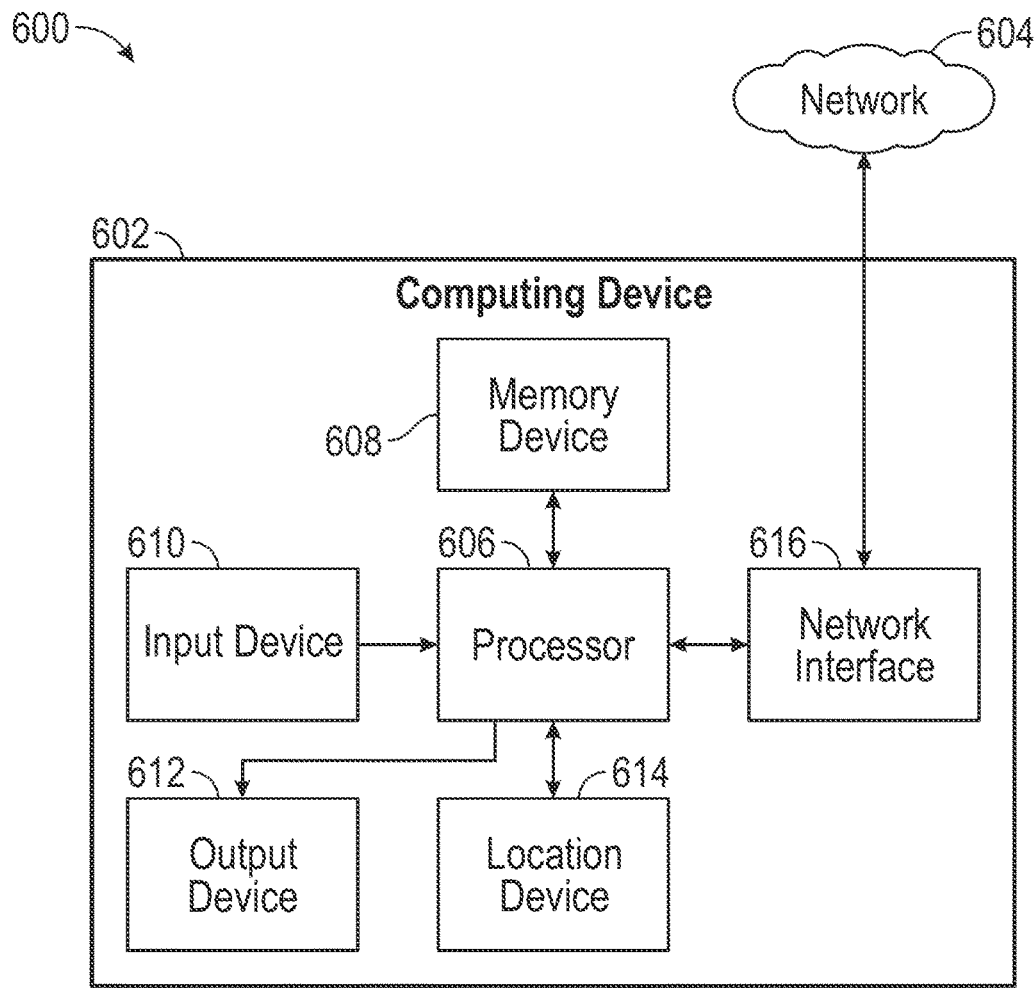
FIG. 6 generally illustrates a block diagram of a system for computing according to the principles of the present disclosure.

FIG. 6 generally illustrates a system 600 for computing including a computing device 602 connected to a network 604 according to the principles of the present disclosure. The computing device 602 may be configured to perform various operations and methods. The computing device 602 may include a processor 606 configured to control the overall operation of the computing device 602 and one or more memory devices 608 that may contain instructions that, when executed by the processor 606, cause the processor to perform a variety of operations. It should be understood that the processor 606 (e.g., and/or any processors described herein) may include any suitable processor, including those described herein. The memory device 608 may include Random Access Memory (RAM), a Read-Only Memory (ROM), or a combination thereof. In some embodiments, the memory device 608 may include flash memory, semiconductor (solid state) memory, a single disk or a plurality of disks (e.g., hard drives), one or more solid-state drives, or one or more hybrid hard drives.

The computing device 602 may also include an input device 610 that may be configured to receive input from an operator of the computing device 602 and to communicate signals representing the input received to the processor 606. For example, the input device 610 may include a button, keypad, dial, touch screen, audio input interface (e.g., microphone), visual/image capture input interface, input in the form of sensor data, etc.

The computing device 602 may include an output device 612 (e.g., a display screen, speaker, or any other suitable output device) that may be controlled by the processor 606 to present information to the operator. The computing device 602 may also include a location device 614 (e.g., a global positioning system (GPS) receiver configured to receive information from one or more global navigation satellite systems (GNSS), cell towers, base stations, and the like). The computing device 602 may also include a network interface 616 configured to couple or connect the computing device 602 to various other computing devices or the network 604 devices via a network connection, such as a wired or wireless connection. In some embodiments, the network interface 616 includes a wireless transceiver.

In some embodiments, the computing device 602 may include additional, fewer, or other components than those described with respect to and illustrated in FIG. 6.

Figure 7:
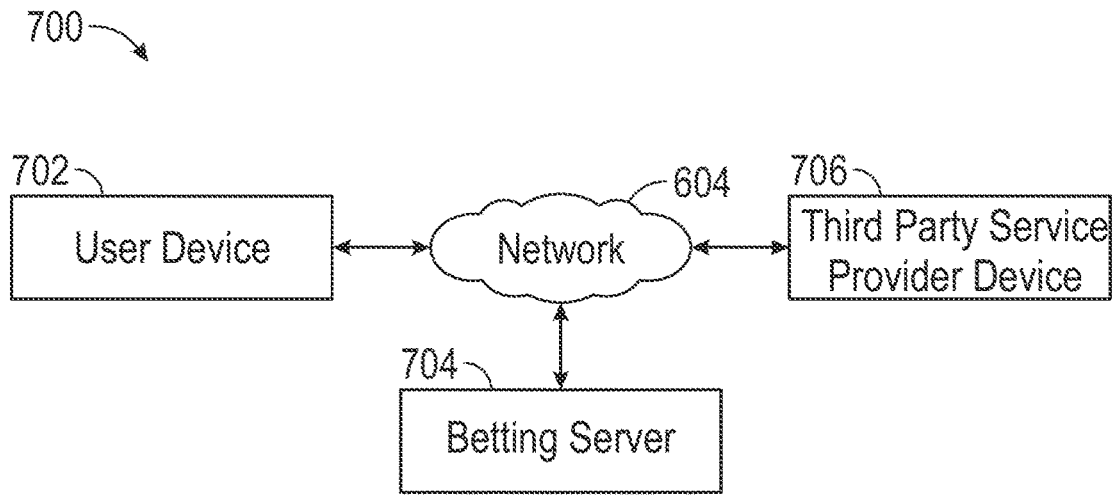
FIG. 7 generally illustrates a block diagram of a system for wagering according to the principles of the present disclosure.
Figure 8A:
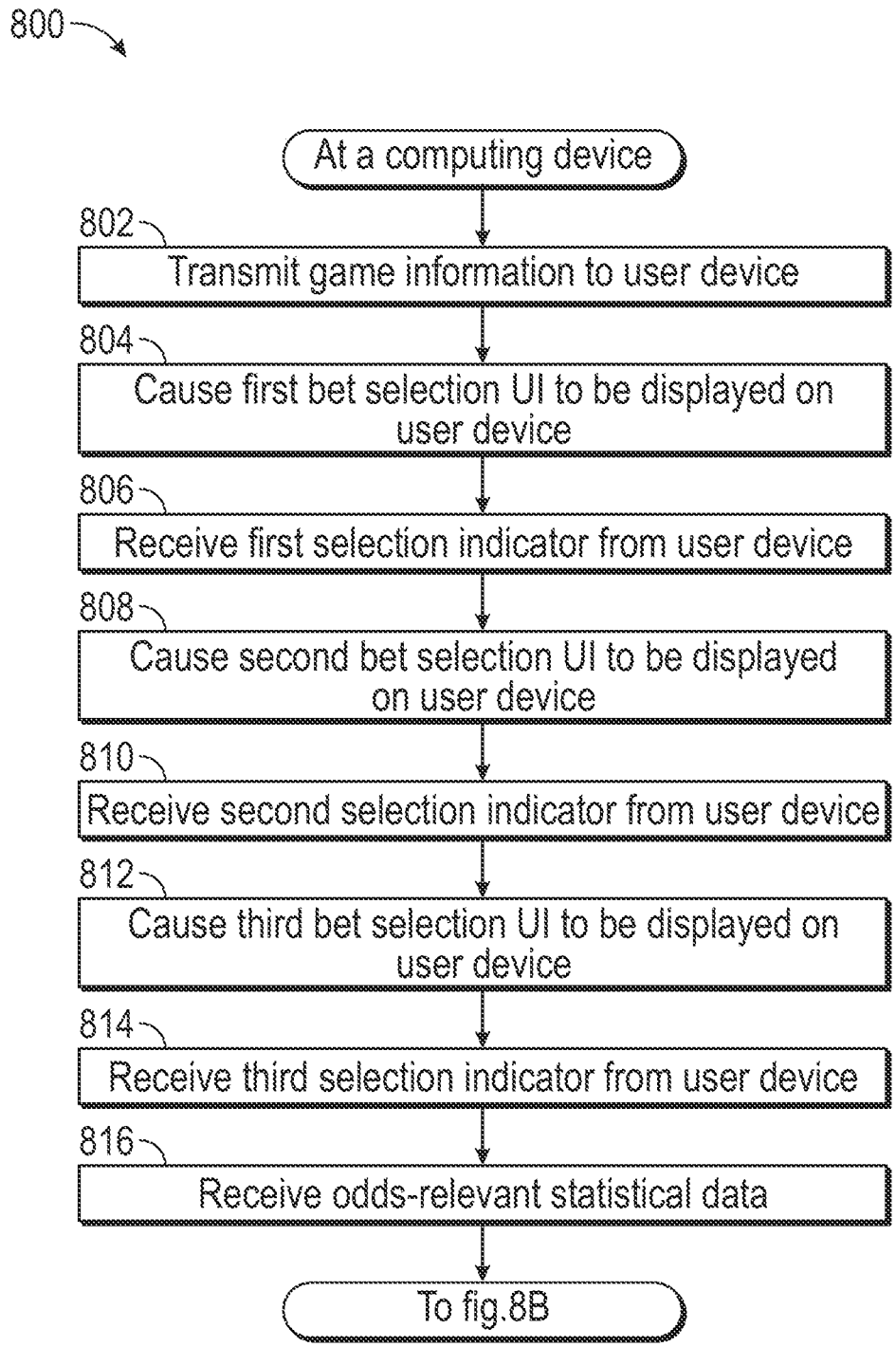
FIGS. 8A-8C illustrate a flow chart illustrating a method of wagering on a game in accordance with another aspect of the present disclosure.
Figure 8B:
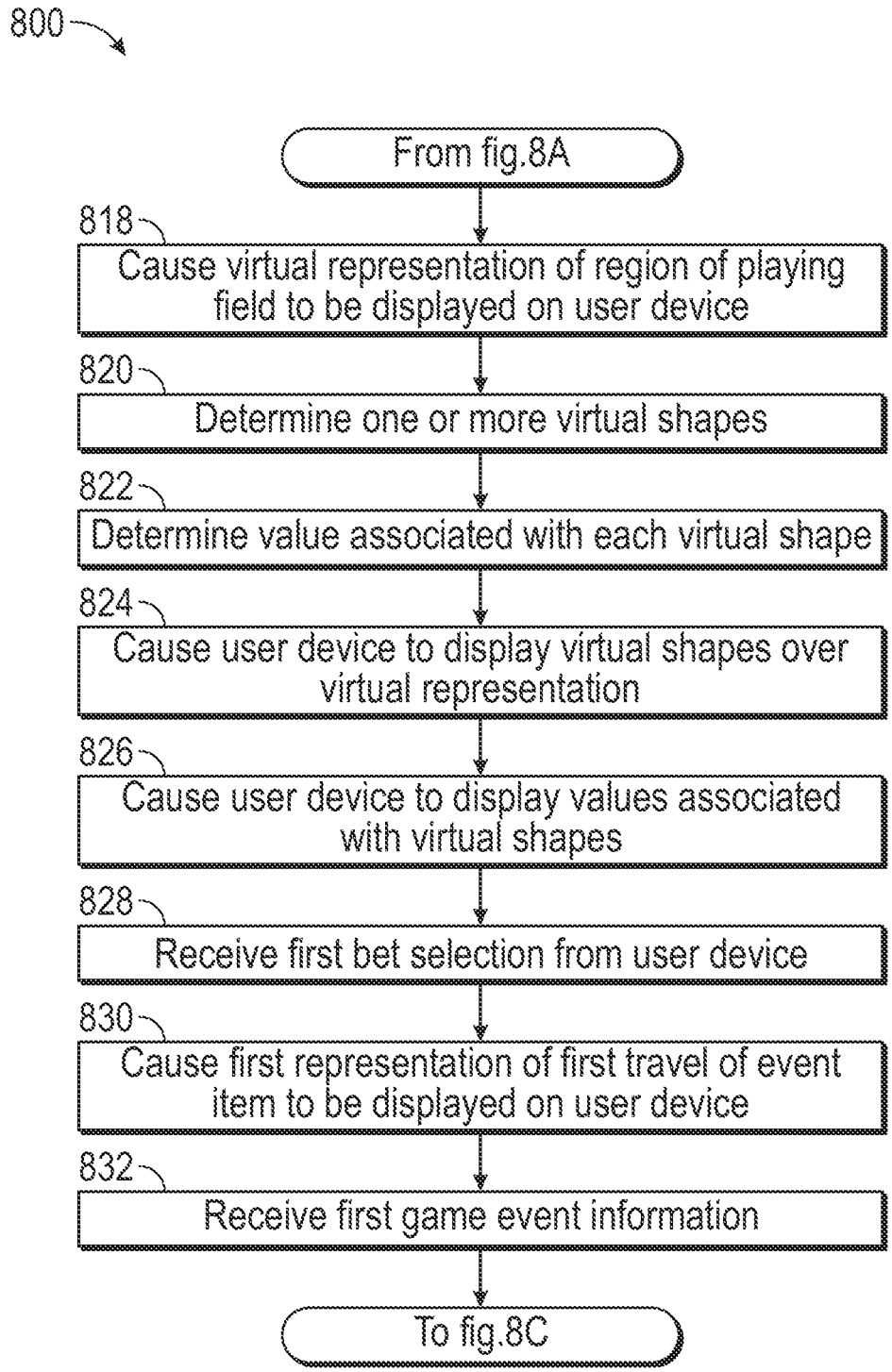
Figure 8C:
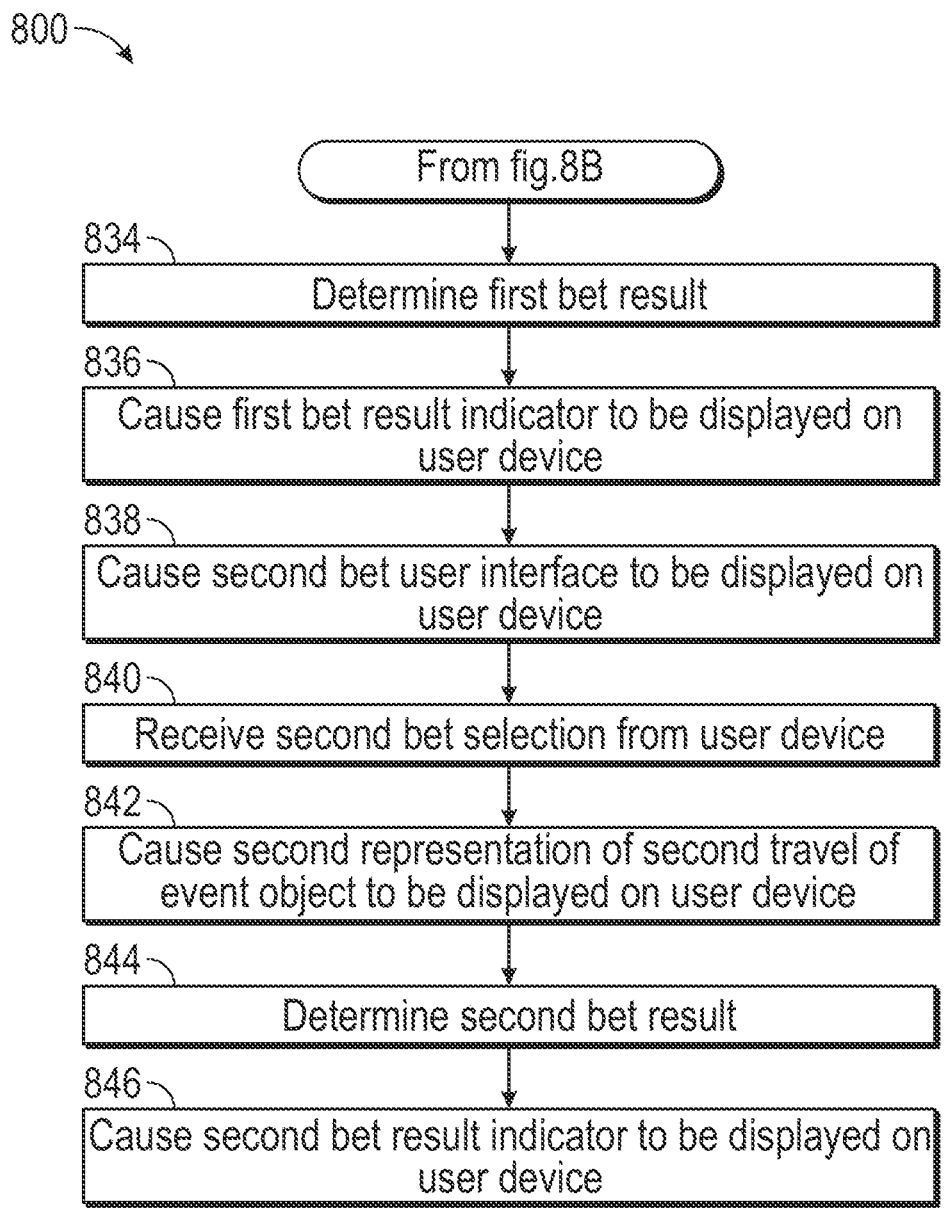

FIG. 7 generally illustrates a system 700 for wagering. The system 700 may include a user device 702, which may include some or all of the feature of computing device 602 of FIG. 6. The user device 702 may be connected to network 604. The user device 702 may be configured to allow a user to place wagers on games, such as a game of golf. The system 700 may include a betting server 704, which may include some or all of the features of computing device 602 of FIG. 6 and may also be connected to network 704. The betting server 704 may enable the user to place bets using the user device 702 while keeping the actual betting software secure and off of the user device 702. The system 700 may further include a third party service provider device 702, which may again include some or all of the features of computing device 602 of FIG. 6 and may also be connected to network 604. The third party service provider device 706 may function to provide information, such as weather information, to the user device 702 or betting server 704. For example, the betting server may generate the overlay or grid on the virtual green of a given hole, as discussed herein FIG. 8 discloses a method 800 for wagering. The method 800 may be implemented on as part of a system including a processor, such as processor 606, and a memory, such as memory device 608, including instructions that, when executed by the processor, cause the processor to perform the steps of the method.

At 802, the method 800 may include transmitting game information to a user device. For example, the betting server 704 may transmit game information to user device 702. Non-limiting examples of the game information may include information relating to specific events, players participating in the game events, and the timing of events.

At 804, the method 800 may include causing a first bet selection user interface (UI) to be displayed on the user device, wherein the first bet selection user interface presents a first choice between one or more different game events to the user. For example, if there are multiple golf events ongoing, the betting server 704 may transmit a signal to the user device 702 causing the user to be presented with a selection between different golf events on the output device 612 of the user device 702.

At 806, the method 800 may include receiving a first selection indicator from the user device indicating a chosen event. For example, the user may select a first of two events using the input device 610 of the user device 702, which accordingly may transmit a first selection indicator indicating the first of the two events to the betting server 704, which in turn receives the first selection indicator.

At 808, the method 800 may include causing a second bet selection user interface to be displayed on the user device, wherein the second bet selection user interface presents a second choice between one or more different mini-events to the user. For example, the betting server 704 may transmit a signal to the user device 702 causing the user to be presented with a selection between different holes on a golf course for a given event on the output device 612 of the user device 702. Alternatively, the user interface may present a user with different players to bet on.

At 810, the method 800 may include receiving a second selection indicator from the user device indicating a chosen mini-event. For example, the user may select the eighth hole using the input device 610 of the user device 702, which accordingly may transmit a second selection indicator indicating a selection of the eighth hole to the betting server 704, which in turn receives the second selection indicator.

At 812, the method 800 may include causing a third bet selection user interface to be displayed on the user device, wherein the third bet selection user interface presents a third choice between player-dependent odds and course-dependent odds. For example, the betting server 704 may transmit a signal to the user device 702 causing the user to be presented with an option to choose between player-dependent odds and course-dependent odds on the output device 612 of the user device 702. As discussed above, the bet selection interfaces may be presented on a mobile application and displayed on a mobile device.

At 814, the method 800 may include receiving a third selection indicator from the user device indicating a whether the player will bet on player-dependent odds and course-dependent odds. For example, the user may select player dependent odds using the input device 610 of the user device 702, which accordingly may transmit a third selection indicator indicating a selection of player dependent odds to the betting server 704, which in turn receives the second selection indicator.

At 816, the method 800 may include receiving odds-relevant statistical data. For example, the betting server 704 may receive information about player performance statistics, golf course information (including, for example statistical information relating to the golf course and positional information like distance to the pin and the slope of the green), weather information, and other potentially relevant information from the third-party service provider device 706.

At 818, the method 800 may include causing a virtual representation of a region a playing field to be displayed on the user device. For example, the betting server 704 may transmit a signal to the user device 702 causing the output device 612 of the user device 612 to display a top view of the eighth hole.

At 820, the method 800 may include determining one or more virtual shapes. For example, the processor 606 of the betting server 704 may determine a series of concentric circles around the eighth hole as well as irregular shapes associated with a sand trap, a water hazard, a hill, or any other feature of a golf course.

At 822, the method 800 may include determining a value associated with each of the one or more virtual shapes, respectively. In some embodiments, if the third selection indicator indicates player-dependent odds, determining the value associated respectively with each of the one or more virtual shapes may be based at least in part on player data. In some embodiments, if the third selection indicator indicates course-dependent odds, determining the value associated respectively with each of the one or more virtual shapes is based at least in part on golf course data. In some embodiments, determining the value associated respectively with each of the one or more virtual shapes is based at least in part on weather data; the choses golf event, the chosen hole, or other relevant information.

At 824, the method 800 may include causing the user device to display the one or more virtual shapes over the virtual representation. For example, the betting server 704 may transmit a signal to the user device 702 causing the output device 612 of the user device 612 to display the virtual shapes over the virtual representation.

At 826, the method 800 may include causing the user device to display the one or more values associated respectively with the one or virtual shapes. For example, the betting server 704 may transmit a signal to the user device 702 causing the output device 612 of the user device 612 to display a series of wager option and payout values associated with the one or more virtual shapes. These values may be displayed in variety of approaches, such as over the virtual shapes, to the side as a chart, etc. In some embodiments, the user may be able to follow the same group of players and bet on that group. In some embodiments, the user may be able to stick with the same hole and follow the next group of players. In some embodiments, the betting may be implemented in a Keno format. In some embodiments, the user can make multiple selections well in advance of the shots being planned.

At 828, the method 800 may include receiving a first bet selection from the user device. For example, the user may select a bet that the ball will end up between 8 and 10 meters from the hole using the input device 610 of the user device 702, which accordingly may transmit a first bet selection indicating a selection of player dependent odds to the betting server 704, which in turn receives the first bet selection.

At 830, the method 800 may include causing a first representation of a first travel of an event item to be displayed on the user device. For example, the betting server 704 may transmit a signal to the user device 702 causing the output device 612 of the user device 612 to display a live video or top-down representation of the ball flying through the air.

At 832, the method 800 may include receiving first game event information indicating the outcome of a first game event. For example, the betting server 704 may receive information about where the ball ended up from the third party service provider device 706.

At 834, the method 800 may include determining a first bet result based on the first game event information and the first bet selection. For example, if the first bet selection indicated a bet that the ball would end up 8-10 meters from the hole and the game event information indicates that the ball ended up 8.7 meters from the hole, the processor 606 of the betting server 704 may determine that the user won the bet.

At 836, the method 800 may include causing a first bet result indicator to be displayed on the user device. For example, the betting server 704 may transmit a signal to the user device 702 causing the output device 612 of the user device 612 to display a message indicating that the user won the bet.

At 838, if the bet result indicator indicates that user won the bet, the method 800 may further include causing a second bet user interface presenting an option to bet on a following event to be displayed on the user device. For example, the betting server 704 may transmit a signal to the user device 702 causing the output device 612 of the user device 612 to display a series of wager option and payout values associated with the one or more outcomes.

At 840, the method 800 may further include receive a second bet selection from the user device. For example, the user may select a bet that a player will make a successful putt on a birdie attempt using the input device 610 of the user device 702, which accordingly may transmit a second bet selection indicating a selection of player dependent odds to the betting server 704, which in turn receives the second bet selection.

At 842, the method 800 may include causing a second representation of a second travel of the event object to be displayed on the user device. For example, the betting server 704 may transmit a signal to the user device 702 causing the output device 612 of the user device 612 to display video or top-down representation of the putt attempt.

At 844, the method 800 may include receiving second game event information indicating the outcome of a second game event. For example, the betting server 704 may receive information about whether the putt attempt was successful from the third party service provider device 706.

At 844, the method 800 may include determining a second bet result based on the second game event information and the second bet selection. For example, if the second bet selection indicated a bet that the putt attempt would be successful and the game event information indicates that the putt attempt was successful, the processor 606 of the betting server 704 may determine that the user won the bet.

At 846, the method 800 may include causing a second bet result indicator to be displayed on the user device. For example, the betting server 704 may transmit a signal to the user device 702 causing the output device 612 of the user device 612 to display a message indicating that the user won the bet.

In some embodiments, the method 800 may loop at various points. In a preferred embodiment, the user is making the bets in real time or close to real time. The method 800 may include additional or fewer of the steps disclosed, and the steps may be rearranged in any suitable order. In some embodiments, an apparatus may include a processor and a memory including instructions that, when executed by the processor, cause the processor to perform the steps of the method 800. In some embodiments, a non-transitory computer-readable storage medium may include executable instructions that, when executed by a processor, facilitate performance of the steps of the method 800. In some embodiments, payouts occur immediately upon a player winning a bet. In some embodiments, the player's winnings are stored as credit on the wagering site. In some embodiments, the method 800 may be applied to games other than standard golf (e.g., Frisbee golf).

Figure 9C:
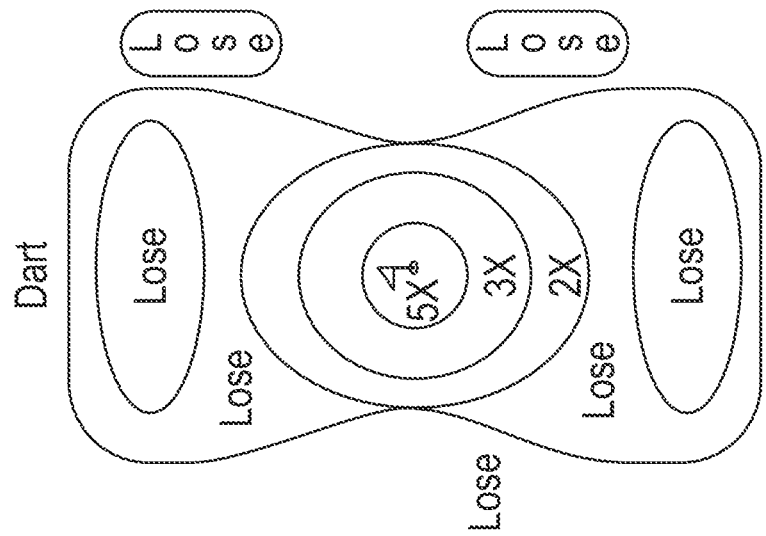
FIGS. 9A-9C illustrate examples of presentation of virtual shapes and values associated therewith on a user interface in accordance with another aspect of the present disclosure.
Figure 9B:
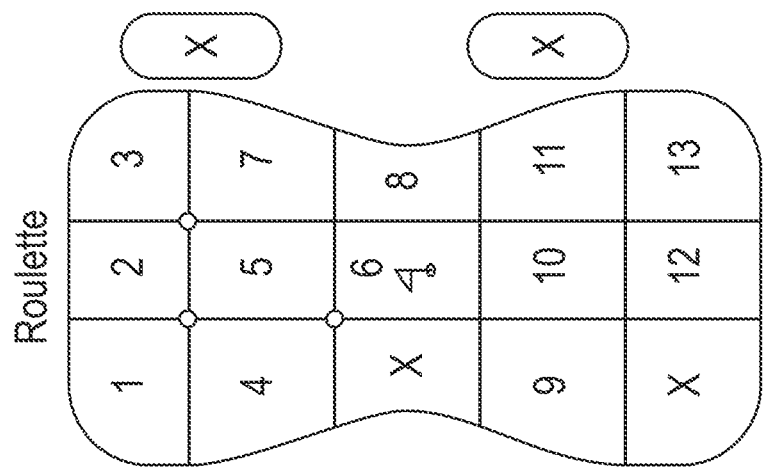
Figure 9A:
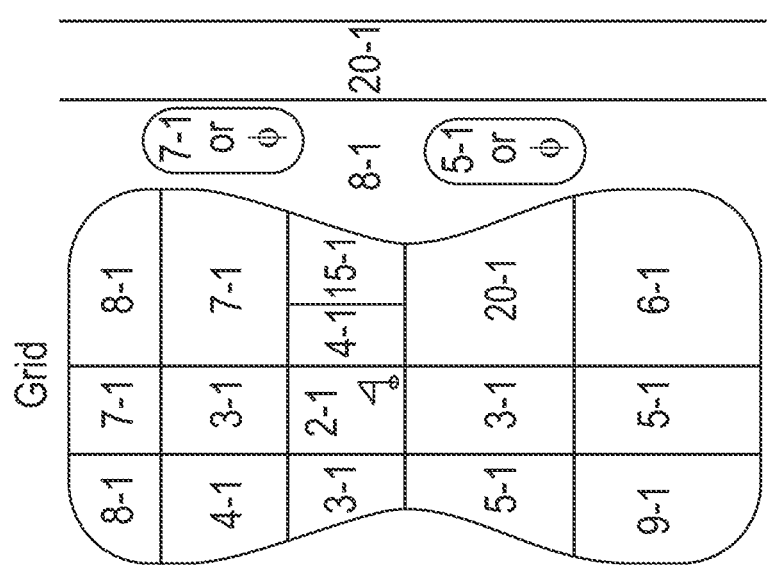

FIGS. 9A-9C show the virtual shapes and associated values based on the different virtual shapes, with FIG. 9A presenting as a "grid," FIG. 9B presenting as a roulette payout table, and FIG. 9C presenting as a "dart board."

In some embodiments, the user device may be multiple user devices. For example, the virtual representation may be a live broadcast on a television and the virtual shapes may be displayed over the live broadcast, which itself may be displayed on a television. The option to select a bet may be displayed on another device, such as a mobile phone, and the server may receive the bet selection from that other device.

In some embodiments, a method for wagering is disclosed. The method includes causing a virtual representation of a region of a golf course to be displayed on a user device. The method further includes determining one or more virtual shapes. The method further includes determining a value associated respectively with each of the one or more virtual shapes. The method further includes causing the user device to display the one or more virtual shapes over the virtual representation. The method further includes causing the user device to display the one or more values associated respectively with the one or virtual shapes. The method further includes receiving a bet selection from the user device.

In some embodiments, the method may include causing a bet selection user interface to be displayed on the user device. In some embodiments, the bet selection user interface may present a choice between player-dependent odds and course-dependent odds. In some embodiments, the method may include receiving a selection indicator from the user device indicating a whether the user has chosen to bet on player-dependent odds and course-dependent odds. In some embodiments, if the selection indicator indicates player-dependent odds, the method may include determining the value associated respectively with each of the one or more virtual shapes is based at least in part on player data. In some embodiments, if the selection indicator indicates course-dependent odds, the method may include determining the value associated respectively with each of the one or more virtual shapes is based at least in part on golf course data. In some embodiments, determining the value associated respectively with each of the one or more virtual shapes may be based at least in part on at least one of weather data, a chosen golf event, and a chosen hole. In some embodiments, the method may include causing a first representation of a first travel of a golf ball to be displayed on the user device. In some embodiments, the method may include receiving first game event information. In some embodiments, the method may include determining a first bet result based on the first game event information and the bet selection. In some embodiments, the method may include causing a first bet result indicator to be displayed on the user device. In some embodiments, if the first bet result indicator indicates that the first bet result was that a user of the user device won the method may include causing a second bet user interface presenting an option to bet on a following golf shot to be displayed on the user device.

In some embodiments, the method may be implemented on a non-transitory computer-readable storage medium, wherein the non-transitory computer-readable storage medium contains instructions that, when executed by one or more processors, cause the one or more processors to perform the steps of the method. In some embodiments, the method may be implemented as part of a system including a server device including a processor and a memory including instructions that, when executed by the processor, cause the processor to perform the method.

Note that not all of the activities described above in the general description or the examples are required, that a portion of a specific activity may not be required, and that one or more further activities may be performed in addition to those described. Still further, the orders in which activities are listed are not necessarily the order in which they are performed.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the systems, algorithms, methods, instructions, etc., described herein may be realized in hardware, software, or any combination thereof. The hardware may include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module may include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module may include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module may include memory that stores instructions executable by a controller to implement a feature of the module.

Further, in one aspect, for example, systems described herein may be implemented using a general-purpose computer or general-purpose processor with a computer program that, when executed, carries out any of the respective methods, algorithms, and/or instructions described herein. In addition, or alternatively, for example, a special purpose computer/processor may be utilized which may contain other hardware for carrying out any of the methods, algorithms, or instructions described herein.

Further, all or a portion of implementations of the present disclosure may take the form of a computer program product accessible from, for example, a computer-usable or computer-readable medium. A computer-usable or computer-readable medium may be any device that can, for example, tangibly contain, store, communicate, or transport the program for use by or in connection with any processor. The medium may be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A system for wagering, comprising:
a server computing device comprising:
a processor; and
a memory including instructions that, when executed by the processor, cause the processor to:
display a real time broadcast stream of a golf competition event, including a region of a golf course of the golf competition event, on a user device;
generate one or more virtual shapes;
determine a value associated respectively with each of the one or more virtual shapes;
overlay the one or more virtual shapes on the region of the golf course on the real time broadcast stream of the golf competition event, such that the one or more virtual shapes and the region of the golf course on the real time broadcast stream of the golf competition event are displayed simultaneously on the user device, wherein a position of the one or more virtual shapes dynamically adjusts
to stay overlaid on the region of the golf course on
the real time broadcast stream of the golf competition event as the orientation of the region of the
golf course displayed on the user device changes;
cause the user device to display the one or more
values associated respectively with the one or
virtual shapes during the real time broadcast
stream of the golf competition event; and
receive a bet selection from the user device associated
with at least one of the one or more virtual shapes and
the one or more values;
wherein the instructions further cause the processor to:
cause a bet selection user interface to be displayed on
the user device, wherein the bet selection user interface presents a choice between player-dependent
odds and course-dependent odds; and
receive a selection indicator from the user device
indicating a whether the user has chosen to bet on
player-dependent odds and course-dependent odds.

2. The system of claim 1, wherein the instructions further cause the processor to:
if the selection indicator indicates player-dependent odds, determine the value associated respectively with each of the one or more virtual shapes is based at least in part on player data; and
if the selection indicator indicates course-dependent odds, determine the value associated respectively with each of the one or more virtual shapes is based at least in part on golf course data.

3. The system of claim 1, wherein determining the value associated respectively with each of the one or more virtual shapes is based at least in part on at least one of weather data, a chosen golf event, and a chosen hole.

4. The system of claim 1, wherein the instructions further cause the processor to cause a first representation of a first travel of a golf ball to be displayed on the user device.

5. The system of claim 1, wherein the instructions further cause the processor to:
receive first game event information; and
determine a first bet result based on the first game event information and the bet selection.

6. The system of claim 5, wherein the instructions further cause the processor to cause a first bet result indicator to be displayed on the user device.

7. The system of claim 6, wherein the instructions further cause the processor to, if the first bet result indicator indicates that the first bet result was that the user won, cause a second bet user interface presenting an option to bet on a following golf shot to be displayed on the user device.

8. A method for wagering, comprising:
displaying a real time broadcast stream of a golf competition event, including a region of a golf course of the golf competition event on a user device;
generating one or more virtual shapes;
determining a value associated respectively with each of the one or more virtual shapes;
overlaying the one or more virtual shapes on the region of the golf course on the broadcast stream of the golf competition event, such that the one or more virtual shapes and the region of the golf course on the real time broadcast stream of the golf competition event are displayed simultaneously on the user device, wherein a position of the one or more virtual shapes dynamically adjusts to stay overlaid on the region of the golf course on the real time broadcast stream of the golf competition event as the orientation of the region of the golf course displayed on the user device changes;
causing the user device to display the one or more values associated respectively with the one or virtual shapes during the real time broadcast stream of the golf competition event;
receiving a bet selection from the user device associated with an upcoming golf swing from a player;
causing a bet selection user interface to be displayed on the user device, wherein the bet selection user interface presents a choice between player-dependent odds associated with the player, and course-dependent odds, and wherein the player-dependent odds and course-dependent odds are associated with the upcoming golf shot from the player;
receiving a selection indicator from the user device indicating whether the user has chosen to bet on the player-dependent odds and the course-dependent odds;
determining a bet result based on at least the bet selection and the outcome of the golf shot; and
causing the user device to display a bet result indicator.

9. The method of claim 8, further comprising:
if the selection indicator indicates player-dependent odds, determining the value associated respectively with each of the one or more virtual shapes is based at least in part on player data; and
if the selection indicator indicates course-dependent odds, determining the value associated respectively with each of the one or more virtual shapes is based at least in part on golf course data.

10. The method of claim 8, wherein determining the value associated respectively with each of the one or more virtual shapes is based at least in part on at least one of weather data, a chosen golf event, and a chosen hole.

11. The method of claim 8, further comprising causing a first representation of a first travel of a golf ball to be displayed on the user device.

12. The method of claim 8, further comprising:
receiving first game event information; and
determining a first bet result based on the first game event information and the bet selection.

13. The method of claim 8, wherein if the first bet result indicator indicates that the first bet result was that a user of the user device won, causing a second bet user interface presenting an option to bet on a following golf shot to be displayed on the user device.

14. A non-transitory computer-readable storage medium, comprising instructions that, when executed by one or more processors, cause the one or more processors to:
display a real time broadcast stream of a golf competition event, including a region of a golf course of the golf competition event on a user device;
generate one or more virtual shapes;
determine a value associated respectively with each of the one or more virtual shapes;
overlay the one or more virtual shapes on the region of the golf course on the real time broadcast stream of the golf competition event, such that the one or more virtual shapes and the region of the golf course on the real time broadcast stream of the golf competition event are displayed simultaneously on the user device, wherein a position of the one or more virtual shapes dynamically adjusts to stay overlaid on the region of the golf course on the real time broadcast stream of the golf competition event as the orientation of the region of the golf course displayed on the user device changes;

cause the user device to display the one or more values associated respectively with the one or virtual shapes during the real time broadcast stream of the golf competition event;

receive a bet selection from the user device, the first bet selection associated with an upcoming first golf shot;

receive first game event information associated with the upcoming first golf shot; and determine a first bet result based on the first game event information, the bet selection and the outcome of the first golf shot;

wherein the instructions further cause the processor to cause a first bet result indicator to be displayed on the user device;

wherein the instructions further cause the processor to, if the first bet result indicator indicates that the first bet result was that the user won, cause a second bet user interface presenting an option to bet on a second golf shot to be displayed on the user device.

15. The non-transitory computer-readable storage medium of claim 14, wherein the instructions further cause the one or more processors to:

cause a bet selection user interface to be displayed on the user device, wherein the bet selection user interface presents a choice between player-dependent odds and course-dependent odds; and receive a selection indicator from the user device indicating a whether the user has chosen to bet on player-dependent odds and course-dependent odds.

16. The non-transitory computer-readable storage medium of claim 15, wherein the instructions further cause the one or more processors to:

if the selection indicator indicates player-dependent odds, determine the value associated respectively with each of the one or more virtual shapes is based at least in part on player data; and if the selection indicator indicates course-dependent odds, determine the value associated respectively with each of the one or more virtual shapes is based at least in part on golf course data.

17. The non-transitory computer-readable storage medium of claim 14, wherein determining the value associated respectively with each of the one or more virtual shapes is based at least in part on at least one of weather data, a chosen golf event, and a chosen hole.

* * * * *